US009110876B2

(12) United States Patent
Untinen et al.

(10) Patent No.: US 9,110,876 B2
(45) Date of Patent: Aug. 18, 2015

(54) MONITORING OPERATION OF COMMUNICATION PROTOCOL PROCEDURE

(71) Applicant: Codenomicon Oy, Oulu (FI)

(72) Inventors: Tuomo Untinen, Oulu (FI); Riku Hietamaki, Sievi (FI); Jukka Taimisto, Oulu (FI); Tero Rontti, Kuopio (FI)

(73) Assignee: Codenomicon Oy, Oulu (FI)

( * ) Notice: Subject to any disclaimer, the term of this patent is extended or adjusted under 35 U.S.C. 154(b) by 154 days.

(21) Appl. No.: 14/022,585

(22) Filed: Sep. 10, 2013

(65) Prior Publication Data

US 2014/0082419 A1    Mar. 20, 2014

(30) Foreign Application Priority Data

Sep. 14, 2012  (FI) ...................................... 20125951

(51) Int. Cl.
| G06F 11/22 | (2006.01) |
| G06F 11/07 | (2006.01) |
| H04L 12/26 | (2006.01) |
| H04L 29/06 | (2006.01) |

(52) U.S. Cl.
CPC ........ G06F 11/2273 (2013.01); G06F 11/0796 (2013.01); H04L 43/18 (2013.01); H04L 43/50 (2013.01); H04L 63/1433 (2013.01); H04L 69/03 (2013.01); H04L 63/08 (2013.01)

(58) Field of Classification Search
CPC .................................................. G06F 11/0796
See application file for complete search history.

(56) References Cited

U.S. PATENT DOCUMENTS

| 5,659,555 | A | 8/1997 | Lee et al. |
| 6,373,822 | B1 | 4/2002 | Raj et al. |
| 2004/0001443 | A1 | 1/2004 | Soon et al. |
| 2005/0033743 | A1* | 2/2005 | Robinson et al. ................. 707/9 |
| 2006/0045121 | A1 | 3/2006 | Monk |
| 2008/0075103 | A1 | 3/2008 | Noble et al. |
| 2011/0083197 | A1* | 4/2011 | Claudatos et al. .............. 726/28 |
| 2012/0042391 | A1* | 2/2012 | Risan ............................... 726/28 |
| 2012/0198557 | A1* | 8/2012 | Pistoia et al. ................... 726/25 |
| 2014/0372979 | A1* | 12/2014 | Ross et al. .................... 717/120 |

* cited by examiner

*Primary Examiner* — Christopher McCarthy
(74) *Attorney, Agent, or Firm* — Hollingsworth Davis, LLC (57) ABSTRACT

This document discloses a method, apparatus, and computer program for automatically detecting unallowed continuation of a communication protocol procedure in a communication device. The method comprises in a test tool: marking an invalid input applied to the communication device in a sequence of operations of the communication protocol procedure; marking, with a sequence marker, a location that should not be reached in the sequence of operations of the communication protocol procedure as a result of the invalid input; and upon detecting that the communication protocol procedure has reached the location marked with the sequence marker, outputting an indication that the communication device operates in an unallowed manner.

19 Claims, 4 Drawing Sheets

MONITORING OPERATION OF COMMUNICATION PROTOCOL PROCEDURE

FIELD

The invention relates to the field of communication protocols and, particularly, to monitoring operation of a communication protocol procedure carried out in a communication device.

BACKGROUND

Execution of a communication protocol in a communication device may be controlled by a computer program carried out by at least one processor of the communication device. The execution of the communication protocol comprises reception of inputs from a counterpart device communicating with the communication device according to the communication protocol. The inputs may comprise authentication data, configuration data, other protocol control data, or application payload data transferred over the communication protocol. The communication device processes the inputs and provides a response to the input according to a program code of the computer program. The response to the inputs should comply with the specifications of the communication protocol, security parameters, etc. For example, reception of false authentication data as the input should not result in successful authentication.

BRIEF DESCRIPTION

According to an aspect of the present invention, there is provided a method for automatically detecting, unallowed continuation of a communication protocol procedure in a communication device, the method comprising in a test tool: marking an invalid input applied to the communication device in a sequence of operations of the communication protocol procedure; marking, with a sequence marker, a location that should not be reached in the sequence of operations of the communication protocol procedure as a result of the invalid input; and upon detecting that the communication protocol procedure has reached the location marked with the sequence marker, outputting an indication that the communication device operates in an unallowed manner.

According to another aspect of the present invention, there is provided an apparatus for automatically detecting unallowed continuation of a communication protocol procedure in a communication device, the apparatus comprising at least one processor; and at least one memory including a computer program code. The at least one memory and the computer program code are configured, with the at least one processor, to cause the apparatus to: mark an invalid input applied to the communication device in a sequence of operations of the communication protocol procedure; mark, with a sequence marker, a location that should not be reached in the sequence of operations of the communication protocol procedure as a result of the invalid input; and upon detecting that the communication protocol procedure has reached the location marked with the sequence marker, output an indication that the communication device operates in an unallowed manner.

According to yet another aspect of the present invention, there is provided a computer program product embodied on a non-transitory distribution medium readable by a computer and comprising program instructions which, when loaded into the computer, execute a computer process for automatically detecting unallowed continuation of a communication protocol procedure in a communication device, the process comprising: marking an invalid input applied to the communication device in a sequence of operations of the communication protocol procedure; marking, with a sequence marker, a location that should not be reached in the sequence of operations of the communication protocol procedure as a result of the invalid input; and upon detecting that the communication protocol procedure has reached the location marked with the sequence marker, outputting an indication that the communication device operates in an unallowed manner.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
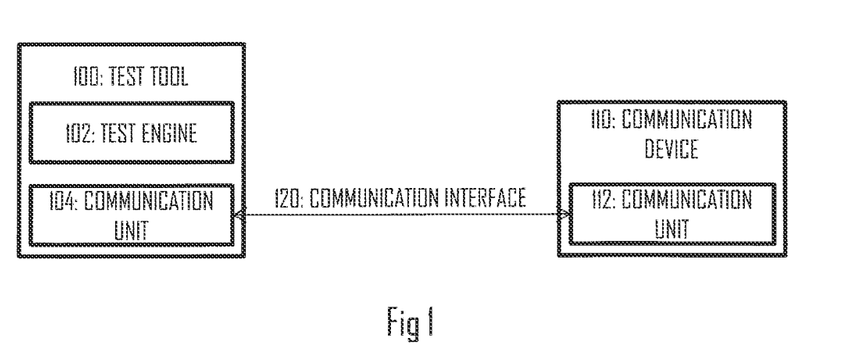
FIG. 1 illustrates an embodiment of a testing arrangement to which embodiments of the invention may be applied.

FIG. 1 illustrates a testing scenario to which embodiments of the invention may be applied. Referring to FIG. 1, operation of a communication device 110 supporting at least one communication protocol is being tested with a test tool 100. The test tool 100 operates as a counterpart communication device by using its communication unit 104 also supporting the at least one communication protocol. The communication unit 102 communicates with a corresponding communication unit 112 comprised in the communication device 110 over a communication interface 120 comprising at least one transmission medium. The communication between the communication units 104, 112 may be realized according to said at least one communication protocol. The test tool 100 further comprises a test engine 102 configured to select and carry out testing of the operation of communication protocol procedures carried out by the communication device 110. The test engine may select a test case to be carried out, instruct the communication unit 104 to operate according to the selected test case, and to monitor the progress of the communication protocol procedures carried out between the communication units 104, 112 during the test case. The test tool may employ fuzz testing in which the test engine 102 tests the operation of the communication device 110 automatically or semi-automatically controls the communication unit 104 to input invalid, unexpected, or random data to the communication device. The test engine 102 then monitors for exceptions in the communication protocol procedures.

In an embodiment, the test tool 100 and the communication device 110 are provided in physically separate devices, and the communication interface 120 may comprise a physical transmission medium external to both devices, e.g. a wired transmission medium in the form of a cable, a wireless link, or even one or more computer networks may be provided between the test tool 100 and the communication device. In another embodiment, the test tool 100 is provided in the communication device 110, and the communication interface 120 may in such an embodiment be a software interface, e.g. an application programming interface (API), simulating the physical transmission medium.

In yet another embodiment, the test engine 102 is provided in the communication device 110, while the communication unit 104 is external to the communication device 110. In such an embodiment, the test engine 102 may be configured to monitor the operation of the communication device 110 passively, e.g. by reading and analysing contents of registers and records of the communication device 110, examining contents of protocol messages transmitted and received by the communication unit 112, and so on. It should be appreciated that there are various testing arrangements that may be used to test the operation of the communication device 110, and the principles of the present invention are applicable also to other testing arrangements than those described herein.

Figure 2:
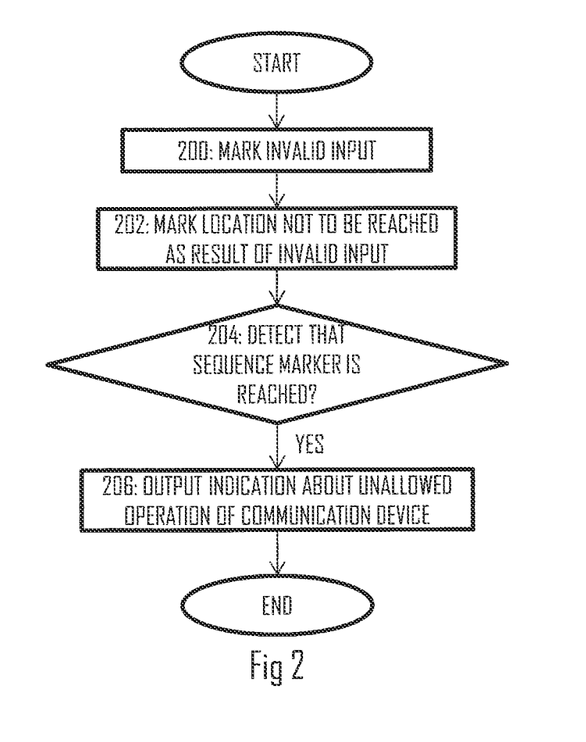
FIG. 2 illustrates a process for automated detection of unallowed continuation of a communication protocol procedure according to an embodiment of the invention.

An embodiment of the invention relates to automatically detecting unallowed continuation of a communication protocol procedure in the communication device 110. The automated detection may be realized by the test tool 100 comprising at least the test engine 102 according to a procedure illustrated in FIG. 2. Referring to FIG. 2, the test tool 100 detects an invalid input applied to the communication device 110 in a sequence of operations of the communication protocol procedure (block 200). In response to the detection of the invalid input, the test tool marks, with a sequence marker, a location in the sequence of operations of the communication protocol procedure that should not be reached as a result of the invalid input (block 202). The sequence marker thus indicates a location where it a decision can be made that the communication device 110 operates in an unallowed manner, provided that the location indicated by the sequence marker is actually reached in the communication protocol procedure. Embodiments of determining the location of the sequence marker are described below. Upon detecting that the communication protocol procedure has reached the location marked with the sequence marker (block 204), the test tool 100 may determine that the communication protocol is continuing the operation when it should not, and the test tool 100 may output an indication that the communication device 110 operates in an unallowed manner. The outputting may comprise creating a record comprising the invalid input and the location of the sequence marker to show which unallowed operation(s) the communication device 110 carried out as a result of the invalid input.

The identification of the invalid input and determining the location for the sequence marker accordingly enables automated detection of unallowed operation of the communication device 110 when it carries out a communication protocol procedure. Specifically, the location of the sequence marker may indicate that the communication device is continuing the communication protocol procedure in the unallowed manner. The location marked with the sequence marker may be determined from the type, location, and/or contents of the invalid input. It is known beforehand from the specification of the communication protocol, specification of the communication device 110 etc. how the communication device 110 should operate in response to the invalid input, e.g. the operational sequence should proceed according to a determined sequence of operations. The sequence marker may be arranged to mark a location in the operational sequence of the communication device that does not belong to this allowed sequence of operations but branches from the allowed sequence. Accordingly, if the test tool 100 detects that the location of the sequence marker has been reached, the test tool 100 is able to make a reliable decision that the operational sequence of the communication device 110 has diverted from the allowed operational sequence and, thus, the communication device 110 operates erroneously.

Above, the execution of the communication control procedure is described as a sequence of operations carried out by the test tool 100 and/or the communication device 110. The communication control procedure executed by the test tool 100, the communication device 110 or they both may equally be considered as a state machine. The sequence marker may specify a certain state of the state machine that should not be reached. This certain state itself may not terminate the communication control procedure and/or it may have outputs only to another state or states that neither terminates the communication control procedure. As a consequence, this certain state may be considered as indicative of the continuation of the procedure, and the sequence marker inserted to that state may specify that the continuation is not according to the intended design of the communication control protocol.

In an embodiment, the invalid input is false authentication data, and the sequence marker is inserted to a location which is at or following a successful completion of authentication. In this case, the test tool 100 knows beforehand that the false authentication data, e.g. erroneous encryption key, user name, or password, should not result in successful authentication. Accordingly, the sequence marker may be inserted to a location where the test tool detects that the authentication has been successfully completed or to a location after the successful completion of the authentication. The location of the sequence marker after the successful completion of the authentication may depend on the communication protocol and the test case. For example, if the test sequence comprises establishing a connection with the communication unit over the communication protocol, carrying out the authentication, and transferring data after the successful authentication, the sequence marker may indicate a location where the data is being transferred. In general, the sequence marker may mark any location in the operational sequence where it can be reliably determined that the communication device 110 has diverted from the allowed operational sequence.

The communication protocol may be basically any communication protocol in the art. The embodiments of the invention are applicable to communication protocols on several protocol layers including the physical layer, link layer, network layer, transport layer, and application layer. Examples of the communication protocols that may be tested with the present invention include Internet protocol (IP), transport control protocol (TCP), user datagram protocol (UDP), stream control transmission protocol (SCTP), signalling system no. 7 (SS7), secure sockets layer (SSL), hypertext transfer protocol (HTTP), physical and link layer protocols of Ethernet or any other wired communication protocol, physical and link layer protocols IEEE 802.11 or any other wireless communication protocol, etc.

Figure 3:
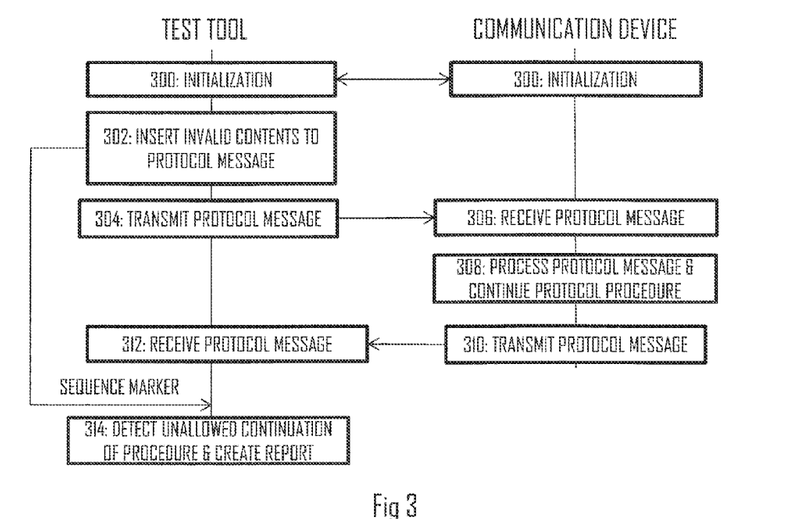
FIG. 3 illustrates a signalling diagram related to a procedure for testing a response of a communication device to an invalid input according to an embodiment of the invention.

In the testing arrangement shown in FIG. 1, the invalid input may be comprised in a communication protocol message transmitted from the test tool 100 to the communication device 110 through the communication unit 104 and using the communication protocol being tested. FIG. 3 illustrates an embodiment of communication between the test tool 100 and the communication device and automatically determining the erroneous operation of the communication device in response to the invalid input. Referring to FIG. 3, the communication unit 104 of the test tool 100 and the communication device 110 initialize a connection according to the specifications of the communication protocol being tested in block 300. Block 300 may also, or alternatively, comprise other type of initialization in the test tool 100 and/or in the communication device 110, e.g. the test tool 100 retrieving a test case from a memory unit and launching the test case.

In block 302, the test tool inserts invalid contents to a protocol message and creates an error location marker. The error location marker may specify the communication protocol message comprising the invalid contents and/or the invalid contents in the communication protocol message. The error location marker may also indicate a location of the invalid communication protocol message in the operational sequence of the test case. As a consequence, the error location marker may mark a location where the test tool 100 has made an intentional error in order to test the response of the communication device 110 to the erroneous operation of the test tool 100. The invalid contents may be the invalid authentication data, as described above. In another embodiment, the invalid contents do not comply with the communication protocol, e.g. an invalid field format of the message or invalid contents in the field(s). In some communication protocols, a certain portion of the protocol message is specified to have a fixed value, and the test tool may change this fixed value to another, invalid value. In this case, the sequence marker may mark a location where the communication protocol procedure proceeds without reception of any error message etc. from the communication device. In some communication protocols, the use of weak security keys is prohibited in the communication, and the invalid contents may specify an attempt to use such a weak security key. In this case, the sequence marker may mark a location where the test tool 100 detects that the communication device 110 has accepted the use of such a weak security key.

Block 302 may also comprise inserting the sequence marker to mark the location in the upcoming operational sequence that should not be reached as a result of the invalid contents of the protocol message. In this case, let us assume that the invalid contents should terminate the operation of the communication protocol procedure or to result in reception of an error message from the communication device. As a consequence, the sequence marker may be inserted to a location in a branch of the operational sequence where the communication control procedure continues without reception of any error message from the communication device 110. In another embodiment, the sequence marker is initially present in the computer program code defining the test setup.

In block 304, the communication unit 104 of the test tool 100 transmits the protocol message, and the communication device 110 receives the protocol message in block 306. In block 308, the communication device 110 processes the received protocol message and carries out the communication protocol procedure in an unallowed manner. The erroneous operation may be caused by errors in programming the communication device, for example. In block 310, the communication device transmits a protocol message to the communication unit 104 of the test tool. This protocol message may be, for example, a response to the protocol message of blocks 304, 306 or another message that indicates the unallowed progress of the procedure. The sequence marker may indicate a location of analysing the contents of this protocol message received from the communication device 110 in block 312. If the contents of the protocol message indicate the unallowed continuation of the procedure, this may trigger the creation of an error report about the unallowed operation of the communication device (block 314). On the other hand, if the received protocol message comprises an error message or otherwise indicates allowed operation of the communication device 110, the test tool 100 may determine that the communication device responds correctly to the invalid input.

Figure 4:
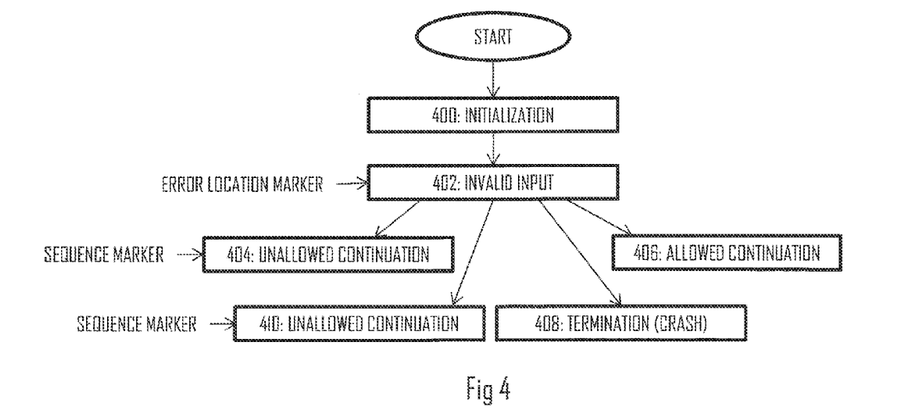
FIG. 4 illustrates utilization of markers according to an embodiment of the invention.

FIG. 4 illustrates a principle of the function of the sequence marker in the procedure. After the initialization of the test case (block 400), the test tool 100 either applies the invalid input to the communication device 110 itself or otherwise detects the invalid input applied to the communication device 110 (block 402). The test tool 100 may also record parameters of the invalid input as the error location marker in block 402. In response to the invalid input, the communication device may operate in one of the following manners: continue the procedure in an allowed manner (block 406) showing that it responds to the invalid input in a specified manner; continue the procedure in an unallowed manner (block 404 or 410) showing that there is an error in the operation of the communication device; or terminate the procedure (block 408) as a result of a crash. The test tool 100 may insert the sequence marker to any location in an operational sequence branch that diverts from the allowed sequence of operations. As shown in FIG. 4, if there are multiple options for the communication device 110 to continue the procedure in the unallowed manner, the test tool 100 may apply a plurality of sequence markers, at least one for each unallowed operational sequence. Additionally, the test tool 100 may apply a sequence marker to the operational sequence that complies with the allowed continuation of the procedure (block 406) to verify the correct operation of the communication device 110. When the procedure reaches this sequence marker, the test tool may create a test report indicating correct operation of the communication device 110. Additionally, the test tool 100 may apply a sequence marker to the location indicating that the procedure has been terminated (block 408). When the procedure reaches this sequence marker, the test tool may create a test report indicating that the process was terminated and, optionally, the reason for the termination, e.g. a crash of the communication device 110.

Figure 5:
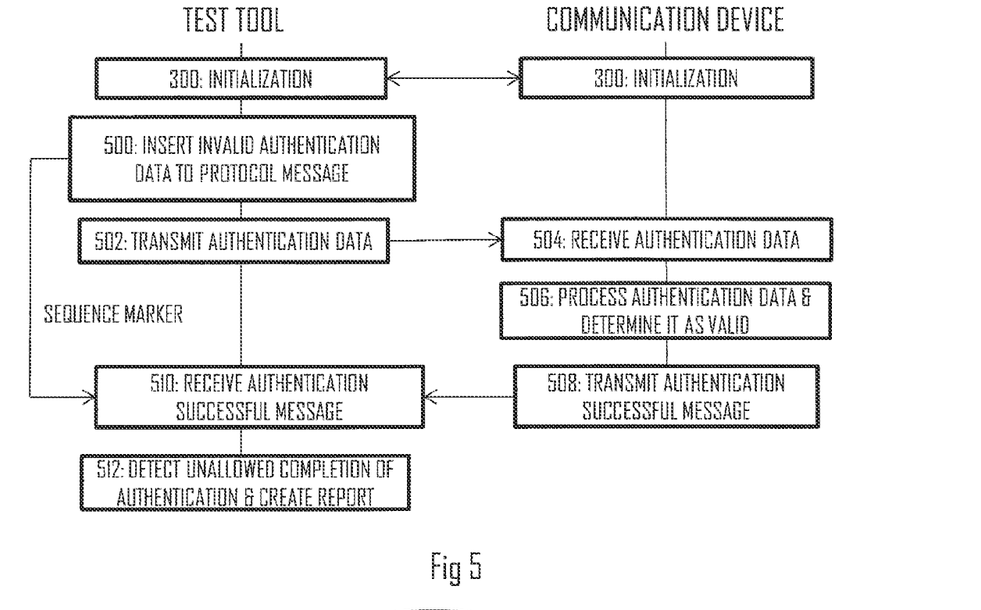
FIG. 5 illustrates a signalling diagram related to a procedure for testing a response of a communication device to an invalid authentication data according to an embodiment of the invention.

FIG. 5 illustrates the procedure when using the invalid authentication data as the invalid input applied to the communication device over the communication protocol. The steps with the same reference signs as in FIG. 3 represent the same or similar operations. Referring to FIG. 5, the test tool inserts the invalid authentication data into a protocol message in block 500, and a sequence marker associated with the protocol message comprising the invalid authentication data is applied to a location in the operational sequence where the test tool 100 detects reception of a response to the protocol message from the communication device 110. In block 502, the test tool transmits the protocol message with the invalid authentication data, and the communication device 110 receives the protocol message in block 504. In block 506, the communication device 110 processes the authentication data and determines it as a valid authentication data. As a consequence, the communication device 110 transmits and authentication successful message in block 508. The test tool detects the reception of the response to the protocol message in block 510 which triggers the sequence marker. As a consequence, the test tool 100 analyzes the contents of the received message and detects that the authentication has been successful regardless of the invalid authentication data (block 512). As a consequence, the test tool 100 creates the error report.

The error location marker and the sequence marker(s) may be linked to each other. The link may be provided at least through the fact that they are both comprised in the same test case. In another embodiment, both the error location marker and the sequence marker(s) have the same identifier(s) within a computer program code defining the test case. For example, the error location marker marking the location of the invalid input may be defined within a computer program code as:

!Verdict: Error Payload(Auth_data)

where !Verdict serves as an identifier, Error may define that the marker is the location of the invalid input, and Payload (Auth_data) specifies that the error is in authentication data used as the invalid. The corresponding sequence marker may be defined within the computer program code as:

!Verdict: Check Auth

The sequence marker shares the same identifier (!Verdict) with the corresponding error location marker, and Check Auth may be used as an element specifying that the sequence marker relates to the authentication procedure. If the computer program executing the test case detects the sequence marker in the execution of the operational sequence, authentication may be interpreted to have been successfully completed indicating that the communication device continues its operation in the unallowed manner, and the creation of the error report may be triggered. The error report may comprise the invalid input that caused the creation of the error report. The invalid input may be highlighted in the error report. The test tool 100 may use at least one element in the error location marker and/or in the sequence marker to include in the error report the procedure that operates in the unallowed manner. For example, the test tool 100 may use the element Check Auth and/or the element Payload(Auth_data) to indicate in the error report that the unallowed operation happens in the authentication procedure. Thus, the provision of the same identifier or use of other means to link the location of the invalid input and the sequence marker enables both the detection of the unallowed operation of the communication device 110 and creation of effective error reports where the invalid input and the result of the invalid input are shown.

In an embodiment, the above-described error location marker and the sequence marker are just notifications of a determined state in the operational sequence for the test tool 100. The test tool 100 may be configured to execute the computer program code defining the test case and, upon detecting the error location marker or the sequence marker within the computer program code, the test tool may call a determined function related to the corresponding marker, e.g. the detection of the sequence marker may trigger the termination of the test case and/or creation of the error report.

In another embodiment, the sequence marker is simply a mark in the operation sequence or in a sequence of functions carried out by the test tool 100 or the communication device 110, depending on the embodiment. In this case, the sequence marker is not necessarily a function but a character, symbol, or a character string within the computer program code that informs the test tool 100 that the operational sequence has reached a certain phase. The appearance of the sequence marker thus serves as the verification that the communication device 110 has allowed the procedure to continue in an undesired manner regardless of the invalid input.

In another embodiment, the invalid input, the error location marker, and the sequence marker are added to a machine-readable protocol specification, which is read and executed by the test tool 100. The machine-readable protocol specification may define the operations of the authentication procedure according to the specified protocol in a machine language, e.g. a computer program code.

Figure 6:
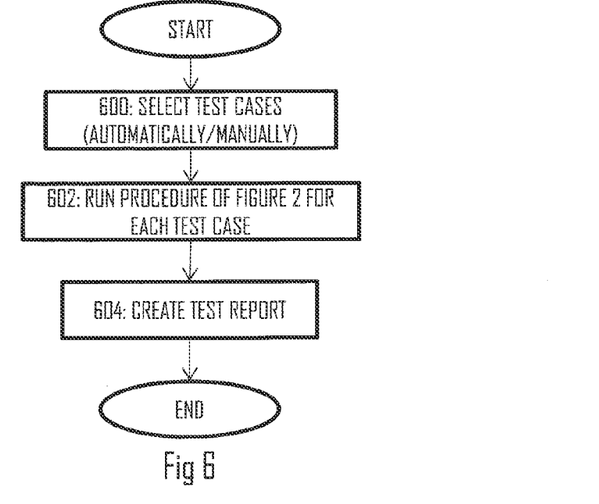
FIG. 6 illustrates a process for carrying out testing according to an embodiment of the invention.

The test tool 100 may execute any one of the above-described testing processes as a part of a series of test cases. FIG. 6 illustrates an embodiment where the test tool 100 tests the operation of the communication device 110 by carrying out multiple test cases. The test tool 100 may employ the above-mentioned fuzz testing or black-box testing and automatically create numerous test cases, wherein each test case may comprise at least one invalid input to test the unallowed continuation of the communication protocol procedure. In an embodiment, the number of automatically created test cases is over one hundred. In another embodiment, the number of automatically created test cases is over one thousand.

Referring to FIG. 6, the test tool 100 selects in block 600 the test cases to be carried out. The selection of the test cases and the selection of the invalid input data to be used may be selected by the test tool 100 automatically or at least some of the test cases and/or the invalid input data to be used may be selected manually by an operator of the test tool 100. The automated/manual selection may depend on the communication protocol to be tested. If the communication protocol is specified in such detail that the location of the error location marker and associated sequence marker may be determined beforehand, e.g. Internet Key Exchange (IKE or IKEv2), the test tool may select the test case for such a protocol, the invalid data, and the locations of the error location marker and the sequence marker autonomously without user interaction. On the other hand, if the communication protocol does not provide any strict protocol specification, e.g. authentication for a HTTP cookie, the operator may input the markers for the location of the authentication token in a HTTP payload data and for the sequence marker.

In block 602, the test tool carries out the test procedure of FIG. 2 or any one of its embodiments described herein for each test case selected in block 600. In block 604, the test tool compiles a test report or a plurality of test reports showing in a highlighted manner the invalid inputs that have caused unallowed operation of the communication device 110.

The embodiments described above provide an indication that the test cases comprise testing the response of the communication device 110 to a situation where one type of data is invalid, e.g. the authentication data. It should be appreciated that in some test cases the test tool 100 may test the response of the communication device 110 to a situation where the input data is invalid in multiple ways. For example, the protocol message may comprise invalid authentication data and the protocol message may be arranged to be incompatible with the communication protocol specification. There may be situations where the communication device is capable of operating correctly when one only type of input is invalid at a time, but a combination of two or more invalid inputs may cause erratic behavior in the operation of the communication device 110. The embodiments of the invention covers also simultaneous testing with multiple types of invalid input data.

Figure 7:
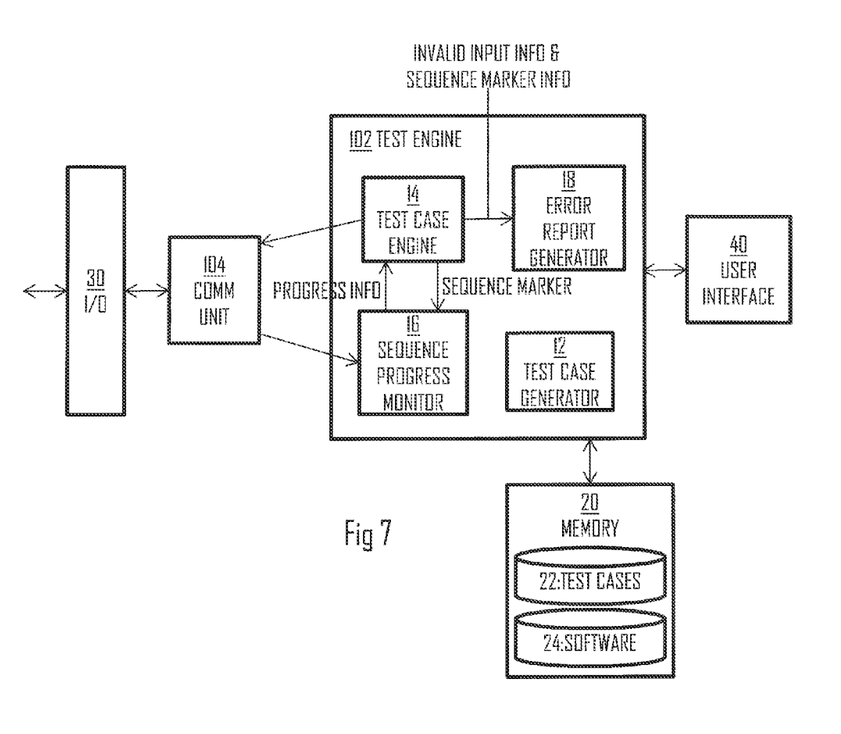
FIG. 7 illustrates a block diagram of an apparatus according to an embodiment of the invention.

FIG. 7 illustrates a block diagram of a structure of an apparatus according to an embodiment of the invention. The apparatus may be comprised in the test tool 100. The apparatus may be a computer, e.g. a laptop, comprising at least one processor and at least one memory including a computer program code, wherein the at least one memory and the computer program code are configured, with the at least one processor, to cause the apparatus to carry out the process of FIG. 2 or any one of the embodiments described above. They may thus be understood as an embodiment of means for carrying out the process of FIG. 2 or any one of the embodiments described above.

Referring to FIG. 7, the apparatus comprises the communication unit 104 operating according to at least one communication protocol tested with the test tool. The apparatus may further comprise an input/output (I/O) circuitry 30 providing a physical connection to the communication device 110. The I/O circuitry 30 may comprise physical components needed for realizing a wired or wireless connection with the communication device 110. Additionally, the I/O circuitry 30 may realize any communication protocols below the communication protocol(s) supported by the communication unit 104 in a protocol stack in order to provide the connection with the communication device 110.

The apparatus may further comprise a memory 20 comprising a test case database 22 and at least one computer program 24 specifying the operation of the test tool 100 in connection with carrying out the testing and selecting the test cases. The test case database 22 may store information on the invalid inputs to be used in the testing, associated error location markers specifying where the invalid inputs should be inserted and associated sequence markers specifying a location which should not be reached in the test case, if the communication device 110 operates in an intended manner with respect to the invalid input.

The apparatus may further comprise a user interface 40 comprising an input device for enabling user to input commands and or data into the apparatus, and an output device for outputting information, e.g. the test report, to the user. The output device may comprise a display screen.

The apparatus may further comprise the test engine 102 realized by at least one processor or processing circuitry of the apparatus and the computer program 24. The test engine 102 may comprise as sub-circuitries or sub-routines a test case generator 12 configured to select the test cases to be carried out. The test case generator may retrieve at least some of the test cases from the test case database 22. The test case generator 12 may also retrieve the associated markers and output the selected test cases to a test case engine 14 controlling the execution of each test case. The test case engine 14 may be configured to derive from the error location marker a location to which insert the invalid input and to control the communication unit to transmit the protocol message with the invalid input to the communication device 110 in the appropriate instance in the operational sequence of the communication protocol and the test case. The test case engine may also output a corresponding sequence marker to a sequence progress monitor circuitry 16 configured to monitor the progress of the test case. The sequence progress monitor circuitry 16 may be configured to monitor the operation of the communication unit 104 and the progress of the communication protocol procedure. The communication unit 104 may be configured to output to the sequence progress monitor circuitry information on messages it transmits to and receives from the communication device 110. As a consequence, the sequence progress monitor circuitry 16 is constantly aware of the progress of the test case and the communication protocol procedure. When the sequence progress monitor circuitry 16 detects that the progress has reached a location indicated by the sequence marker received from the test case engine 14, the sequence progress monitor circuitry 16 may output a notification to the test case engine 14. The test case engine 14 may then call an error report generator 18 to record an error report. The test case engine 14 may provide the error report generator 18 with information on the invalid input used in the test case and information on the location of the sequence marker to specify the result of the invalid input. The error report generator 18 may then store the report in the memory 20.

In embodiments where the test tool 100 is comprised in the communication device 110, the apparatus may be a computer, a server, a portable computer, a palm device, a measurement device, etc. capable of communicating with other devices according to at least one communication protocol. The test tool 100 may then be realized as the computer program and utilize a processor or processors and a memory or memories of the communication device in the execution of the testing. The operation of the test tool may still follow the principles described herein.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 6 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to test tools and communication protocols defined above but also to other scenarios. The communication protocols and test methods may develop over time, and such development may require extra changes to the described embodiments. Therefore, all words and expressions should be interpreted broadly and they are intended to illustrate, not to restrict, the embodiments. It will be obvious to a person skilled in the art that, as technology advances, the inventive concept can be implemented in various ways. The invention and its embodiments are not limited to the examples described above but may vary within the scope of the claims.

The invention claimed is:

1. A method for automatically detecting, unallowed continuation of a communication protocol procedure in a communication device, the method comprising in a test tool:
    marking an invalid input applied to the communication device in a sequence of operations of the communication protocol procedure;
    marking, with a sequence marker, a location that should not be reached in the sequence of operations of the communication protocol procedure as a result of the invalid input; and
    upon detecting that the communication protocol procedure has reached the location marked with the sequence marker, outputting an indication that the communication device operates in an unallowed manner.

2. The method of claim 1, wherein the invalid input is false authentication data, and wherein the sequence marker is inserted to a location which is at or following a successful completion of authentication.

3. The method of claim 1, wherein the invalid input is comprised in a communication protocol message transmitted to the communication device, wherein the invalid input causes the communication protocol message to become incompatible with a specification of the communication protocol being executed.

4. The method of claim 1, further comprising creating automatically a plurality of test cases for the communication device, wherein each test case comprises at least one invalid input.

5. The method of claim 1, further comprising linking a location of the invalid input with the location of the corresponding sequence marker.

6. The method of claim 1, wherein the test tool communicates with the communication device according to the communication protocol procedure and carries out fuzz testing of the communication device, and wherein said detecting the invalid input applied to the communication device comprises causing the test tool to apply the invalid input to the communication device in a protocol message transferred from the test tool to the communication device.

7. The method of claim 6, wherein the invalid input and associated sequence marker are inserted automatically as a part of the fuzz testing.

8. The method of claim 1, wherein the sequence marker indicates a response message from the communication device that should not be transmitted as a response to the invalid input.

9. The method of claim 1, wherein said outputting the indication comprises outputting the invalid input and an indication about the corresponding location reached in the communication protocol procedure.

10. An apparatus for automatically detecting unallowed continuation of a communication protocol procedure in a communication device, the apparatus comprising:
    at least one processor; and
    at least one memory including a computer program code, wherein the at least one memory and the computer program code are configured, with the at least one processor, to cause the apparatus to:
    mark an invalid input applied to the communication device in a sequence of operations of the communication protocol procedure;
    mark, with a sequence marker, a location that should not be reached in the sequence of operations of the communication protocol procedure as a result of the invalid input; and
    upon detecting that the communication protocol procedure has reached the location marked with the sequence marker, output an indication that the communication device operates in an unallowed manner.

11. The apparatus of claim 10, wherein the invalid input is false authentication data, and wherein the at least one memory and the computer program code are configured, with the at least one processor, to cause the apparatus to insert the sequence marker to a location which is at or following a successful completion of authentication.

12. The apparatus of claim 10, wherein the invalid input is comprised in a communication protocol message transmitted to the communication device, wherein the invalid input causes the communication protocol message to become incompatible with a specification of the communication protocol being executed.

13. The apparatus of claim 10, wherein the at least one memory and the computer program code are configured, with the at least one processor, to cause the apparatus to create automatically a plurality of test cases for the communication device, wherein each test case comprises at least one invalid input.

14. The apparatus of claim 10, wherein the at least one memory and the computer program code are configured, with the at least one processor, to cause the apparatus to link a location of the invalid input with the location of the corresponding sequence marker.

15. The apparatus of claim 10, wherein the at least one memory and the computer program code are configured, with the at least one processor, to cause the apparatus to communicate with the communication device according to the communication protocol procedure and carry out fuzz testing of the communication device, and wherein the at least one memory and the computer program code are configured, with the at least one processor, to cause the apparatus to detect the invalid input applied to the communication device by applying the invalid input to the communication device in a protocol message transferred from the apparatus to the communication device.

16. The apparatus of claim 15, wherein the at least one memory and the computer program code are configured, with the at least one processor, to cause the apparatus to insert the invalid input and associated sequence marker automatically as a part of the fuzz testing.

17. The apparatus of claim 10, wherein the sequence marker indicates a response message from the communication device that should not be transmitted as a response to the invalid input.

18. The apparatus of claim 10, wherein the at least one memory and the computer program code are configured, with the at least one processor, to cause the apparatus to output the invalid input and an indication about the corresponding location reached in the communication protocol procedure.

19. A computer program product embodied on a non-transitory distribution medium readable by a computer and comprising program instructions which, when loaded into the computer, execute a computer process for automatically detecting unallowed continuation of a communication protocol procedure in a communication device, the process comprising:
    marking an invalid input applied to the communication device in a sequence of operations of the communication protocol procedure;
    marking, with a sequence marker, a location that should not be reached in the sequence of operations of the communication protocol procedure as a result of the invalid input; and upon detecting that the communication protocol procedure has reached the location marked with the sequence marker, outputting an indication that the communication device operates in an unallowed manner.

* * * * *